US008191851B2

(12) United States Patent
Crown

(10) Patent No.: US 8,191,851 B2
(45) Date of Patent: Jun. 5, 2012

(54) METHOD AND APPARATUS FOR SECURING A DEVICE AT A DESIRED LOCATION

(75) Inventor: Peter Crown, Loughborough (GB)

(73) Assignee: Artform International Limited, Leicestershire (GB)

( * ) Notice: Subject to any disclaimer, the term of this patent is extended or adjusted under 35 U.S.C. 154(b) by 529 days.

(21) Appl. No.: 12/374,649

(22) PCT Filed: Jun. 11, 2007

(86) PCT No.: PCT/GB2007/002171
§ 371 (c)(1),
(2), (4) Date: Jan. 21, 2009

(87) PCT Pub. No.: WO2008/009875
PCT Pub. Date: Jan. 24, 2008

(65) Prior Publication Data
US 2009/0173863 A1 Jul. 9, 2009

(30) Foreign Application Priority Data

Jul. 21, 2006 (GB) .................................. 0614436.4

(51) Int. Cl.
*F16M 13/00* (2006.01)
(52) U.S. Cl. .............. 248/553; 70/19; 70/58; 248/316.4
(58) Field of Classification Search ............ 70/14, 57.1, 70/58, 18, 19; 248/551, 553, 316.4, 316.1, 248/309.1, 229.12, 229.22; 455/575.1
See application file for complete search history.

(56) References Cited

U.S. PATENT DOCUMENTS

| 3,895,768 | A | | 7/1975 | Scheck |
| 4,458,874 | A | | 7/1984 | Rabas et al. |
| RE35,677 | E | * | 12/1997 | O'Neill .................. 248/551 |
| 5,694,468 | A | * | 12/1997 | Hsu ....................... 379/446 |
| 6,027,277 | A | | 2/2000 | Leyden et al. |

(Continued)

FOREIGN PATENT DOCUMENTS

DE 20014858 U1 12/2000

(Continued)

OTHER PUBLICATIONS

Written Opinion and International Search Report of the International Searching Authority for corresponding International Application No. PCT/GB2007/002171. Filing Date Nov. 6, 2007.

(Continued)

*Primary Examiner* — Ramon Ramirez
(74) *Attorney, Agent, or Firm* — Klarquist Sparkman, LLP

(57) ABSTRACT

An apparatus and method are disclosed for securing an electrical device at a desired location. The apparatus includes a housing comprising a support surface on which an electronic device can be supported and a pair of opposed jaw members mounted with the housing, locatable with respect to each other, and arranged to be urged against respective sides of an electronic device to thereby clamp the electronic device at a desired location. At least one of the jaw members includes a region arranged to urge the electronic device against the support surface when the electronic device is clamped at the desired location.

32 Claims, 9 Drawing Sheets

U.S. PATENT DOCUMENTS

| | | | | |
|---|---|---|---|---|
| 6,105,922 | A * | 8/2000 | Derman | 248/551 |
| 6,212,918 | B1 * | 4/2001 | Kravtin | 70/14 |
| 6,256,387 | B1 * | 7/2001 | Wang | 379/446 |
| 6,320,962 | B1 | 11/2001 | Eisenbraun | |
| 6,888,940 | B1 | 5/2005 | Deppen | |
| 6,896,232 | B2 * | 5/2005 | Crowell et al. | 248/316.4 |
| 7,540,459 | B2 * | 6/2009 | Asano et al. | 248/309.1 |
| 7,669,816 | B2 * | 3/2010 | Crain et al. | 248/183.3 |
| 2002/0190176 | A1 * | 12/2002 | Louh | 248/316.4 |
| 2003/0029208 | A1 * | 2/2003 | Merrem et al. | 70/58 |
| 2003/0034429 | A1 | 2/2003 | Carnevali | |
| 2004/0204156 | A1 | 10/2004 | Tsai | |
| 2004/0254002 | A1 * | 12/2004 | Tsay | 455/575.9 |
| 2005/0072691 | A1 | 4/2005 | Schlansky | |
| 2005/0236545 | A1 | 10/2005 | Seil et al. | |
| 2006/0278788 | A1 * | 12/2006 | Fan | 248/309.1 |
| 2008/0223090 | A1 * | 9/2008 | Liao | 70/58 |

FOREIGN PATENT DOCUMENTS

| | | |
|---|---|---|
| DE | 10051676 A | 5/2002 |
| GB | 19719512 A1 | 11/1998 |
| GB | 2359850 A | 9/2001 |
| GB | 2362423 A | 11/2001 |
| WO | WO03/074825 A | 9/2003 |

OTHER PUBLICATIONS

United Kingdom Patent Office, "The Patent Office, Patents Directorate, United Kingdom Search Report" for corresponding Great Britain Application No. GB06144364.4, Mar. 7, 2007, 3 pages.

International Preliminary Report on Patentability and Written Opinion of the International Searching Authority for corresponding International Application No. PCT/GB2007/002171. Filing date Jun. 11, 2007.

* cited by examiner

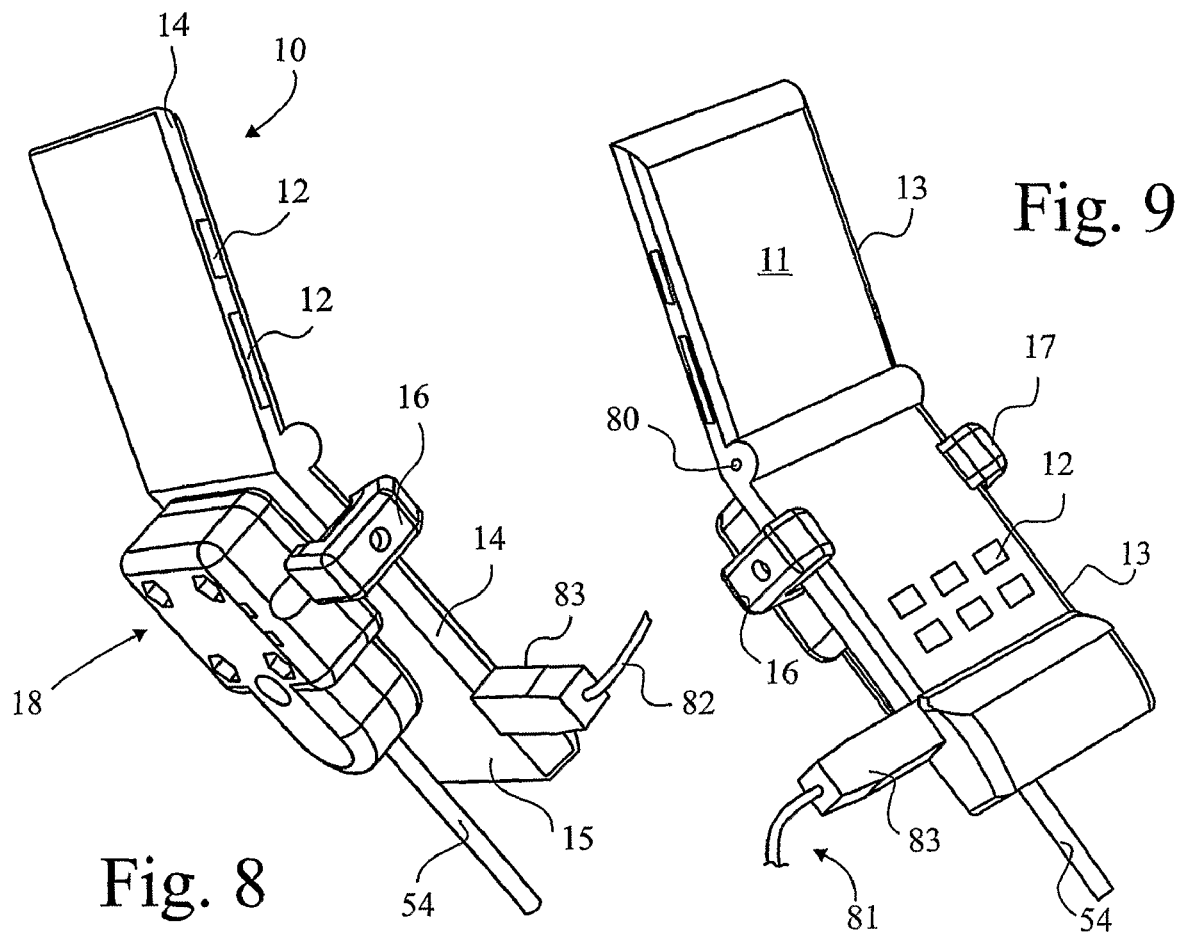
Fig. 9
Fig. 8
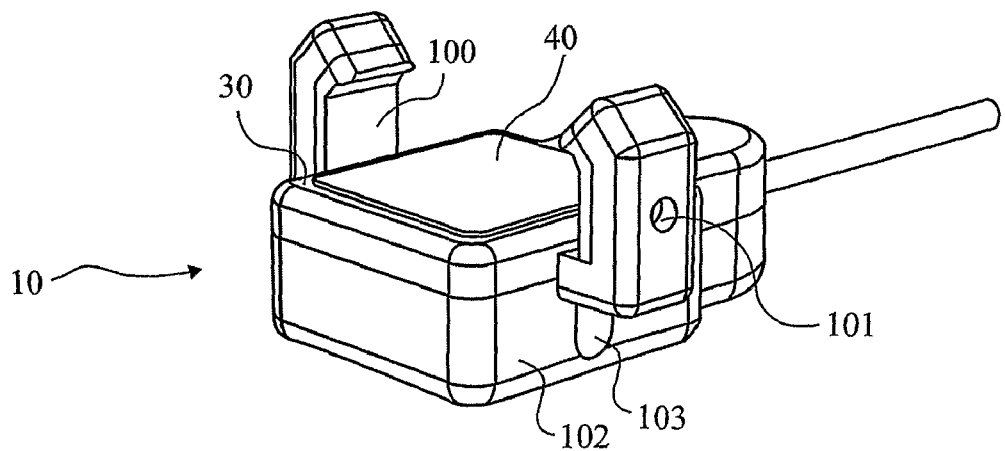
Fig. 10

METHOD AND APPARATUS FOR SECURING A DEVICE AT A DESIRED LOCATION

CROSS REFERENCE TO RELATED APPLICATIONS

This is the U.S. National Stage of International Application No. PCT/GB2007/002171, filed Jun. 11, 2007, which in turn claims the benefit of Great Britain Application No. 0614436.4, filed Jul. 21, 2006.

The present invention relates to apparatus and a method for securing an electrical device at a desired location. In particular, but not exclusively, the present invention relates to apparatus which can be secured at a predetermined position, for example, in a retail outlet and to which electrical goods, such as mobile telephones can be mounted whereby users can test the functionality of the device prior to purchase.

Recent advances in communication technology have brought about a significant increase in the variety and complexity of communication devices and communication services in the market place. The competition between retailers, service providers and equipment manufacturers increases apace and the size of the market is growing rapidly in value. In the face of such competition in a potentially lucrative market, there is a desire for retailers to be able to provide testing of both communication devices and telecommunication services (including downloads for example) to customers at a point of sale in order to secure a sale. Communication devices are just one subset of electrical device in general which is provided to give a user access to functionality. It is to be understood that embodiments of the present invention are applicable to electrical devices in general.

Communication devices themselves vary in complexity, size and shape and many these days include a variety of "additional" features such as cameras and MP3 players. It would be advantageous for these devices to be available at a point of sale in a retail environment to allow a consumer to try the device and one or more of its functions and/or try one or more services on offer. However, because the devices run off batteries, the devices tend to run out of power and often consumers are faced with a non-functioning device. In order to overcome this problem there is a requirement to keep the devices fully or partially charged so that functionality is accessible to users. This is costly and time consuming for personnel working in the retail environment.

A further problem is that the devices themselves are often of a high retail value and are therefore prone to theft. The requirement to provide uninhibited use of the device in-store whilst minimising the possibility of theft has been a well-known problem for retailers for many years. Some current solutions include a simple tether device secured by a high-tack self-adhesive pad. This is only a minor deterrent, however, because it is easy for a determined thief to peel off an adhesive pad and steal the electrical device.

Other known deterrents include a tether mechanism wherein an alarm is fitted and sounds if a pad is removed or a tethering wire severed in some way. However, many thieves have become increasingly confident so an alarm system no longer provides a sufficient deterrent. Furthermore, a sounding alarm needs a response and it is often costly and time consuming for a retail environment to provide sufficient staff to deal with such a situation.

Another problem is that it has proved very difficult to design a method of securely attaching a security tether to a communication device because there are many different shapes of communication device which vary in size and shape. In addition, the attachment means must not interfere with a user interface of the device otherwise access to the functionality of the electrical device may be inhibited.

It is an aim of the present invention to at least partly mitigate the above-mentioned problems.

It is an aim of embodiments of the present invention to provide a method and apparatus for securing an electrical device such as a personal data assistant (PDA) or mobile telephone at a desired location.

It is an aim of embodiments of the present invention to provide a method and apparatus for securing an electrical device at a desired location and provide power to the electrical device so as to keep the device fully or at least partially recharged.

It is an aim of embodiments of the present invention to provide a method and apparatus for securing an electrical device at a desired location in such a way that access to a user interface such as a screen and/or keys of the electrical device is not impeded by the securing apparatus.

According to a first aspect of the present invention there is provided apparatus for securing an electrical device at a desired location, comprising:

a housing comprising a support surface on which an electronic device can be supported;

a pair of opposed jaw members mounted with said housing, locatable with respect to each other, and arranged to be urged against respective sides of said electronic device to thereby clamp said electrical device at a desired location; wherein at least one of said jaw members includes a region arranged to urge said electronic device against said support surface when said electrical device is clamped at said desired location.

According to a second aspect of the present invention there is provided a method for securing an electrical device at a desired location, comprising the steps of:

securing a housing comprising a support surface and a pair of opposed jaw members at a predetermined location;

locating an electrical device on said support surface between said jaw members;

clamping sides of said electronic device between said jaw members; and simultaneously urging a back surface of the electrical device towards the support surface.

Embodiments of the present invention provide a method and apparatus for securing an electrical device such as a PDA or mobile telephone at a desired location, for example in a retail store. The electrical device is secured such that the device cannot simply be pulled or peeled away from a tether and thus be simply stolen.

Embodiments of the present invention provide the advantage that an electrical device can be secured so as to avoid theft and in addition is supplied with a power source which can power the device so that functionality, such as a camera or MP3 player, can be tried by a user at a point of sale prior to purchase.

Embodiments of the present invention will now be described hereinafter, by way of example only, with reference to the accompanying drawings in which:

FIG. 8 illustrates a reverse view of a security clamp and mobile telephone;

FIG. 9 illustrates a front view of a mobile telephone and security clamp;

FIG. 10 illustrates a security clamp without electrical device;

In the drawings like reference numerals refer to like parts.

Figure 1:
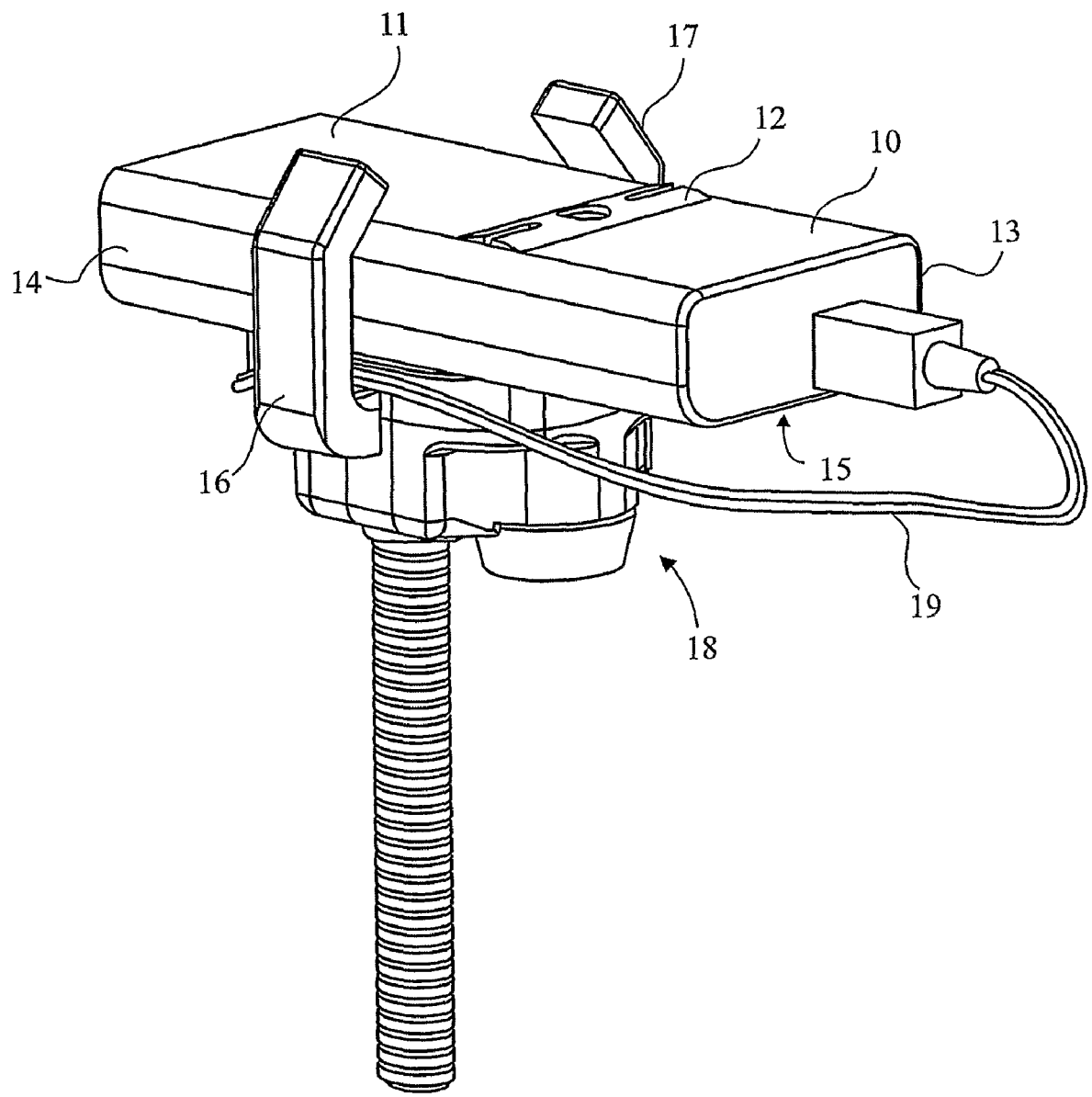
FIG. 1 illustrates a mobile telephone secured at a desired location.

FIG. 1 illustrates an electrical device 10 (shown as a mobile telephone) in a security clamp apparatus in accordance with an embodiment of the present invention. It is to be understood that embodiments of the present invention may be applied to the securement at a desired location of any type of electrical device, such as a mobile telephone, PDA, laptop or TV or others. It is also to be understood that the desired location where the device is secured may be in a retail environment, such as a shop, or at any other location where users such as potential customers are to be provided with access to the electrical device so as to test its functionality and observe the design of the item.

The mobile telephone has a user interface including a screen 11 and user keys 12. These are provided on a front side of the mobile telephone so as to be viewed and used by a user. A user can select functions provided by the electrical device by pressing one or more of the keys 12. The mobile telephone has a first and second side 13, 14 and a back side 15.

The mobile telephone is clamped by virtue of two jaws 16, 17 which help secure the mobile telephone to a housing 18 of the security clamp.

A connector 19 including a wire has at a first end a plug selected to fit to a desired mobile telephone. At a remaining end of the wire (not shown in FIG. 1) a further connector is fitted and may be plugged into a universal style socket in the housing 18 of the clamp.

Figure 2:
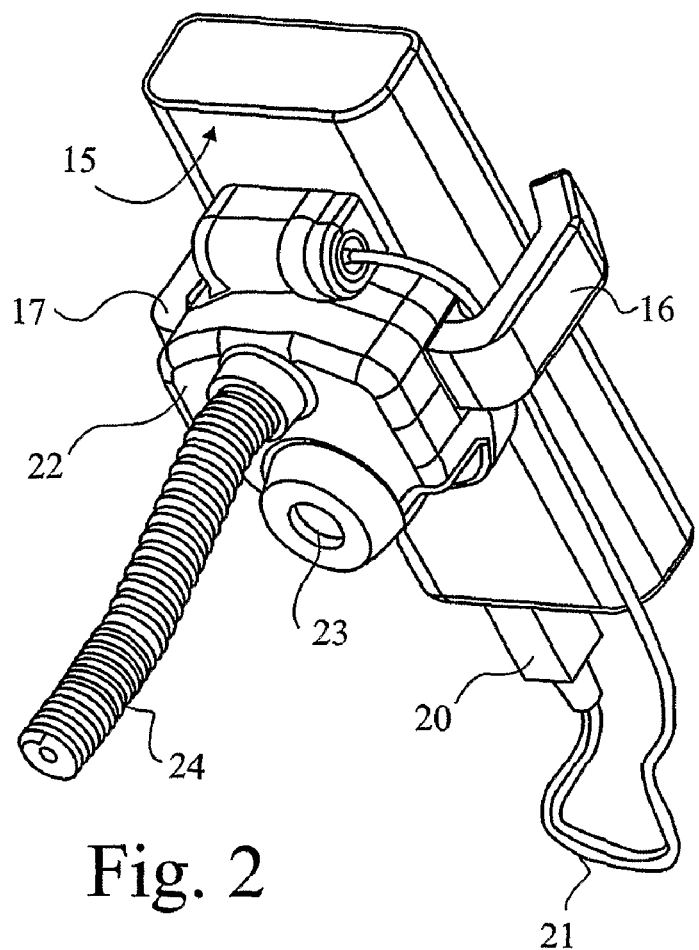
FIG. 2 illustrates a reverse view of a mobile telephone.

FIG. 2 illustrates a view of the back side 15 of the electrical device when clamped between the jaws 16, 17 of the clamp. FIG. 2 shows the connector 19 in more detail which includes the plug 20 which is specific for the particular electrical device to be mounted and secured in the clamp with a connecting wire 21 leading into a socket space in the housing 18.

The housing for the clamping apparatus includes a back cover 22 formed of a rigid tamperproof material providing access to a cam lock via an opening 23 through which a user can introduce a key to remove the back cover 22. A security sleeve 24 extends through an aperture in the back cover. The security sleeving prevents unauthorised users tampering with an internal tether passing longitudinally along the length of the security sleeving. The security sleeving also houses a wire used to supply power to the socket of the clamp housing and thus supply power via the connector 19 to the mobile telephone.

Figure 3:
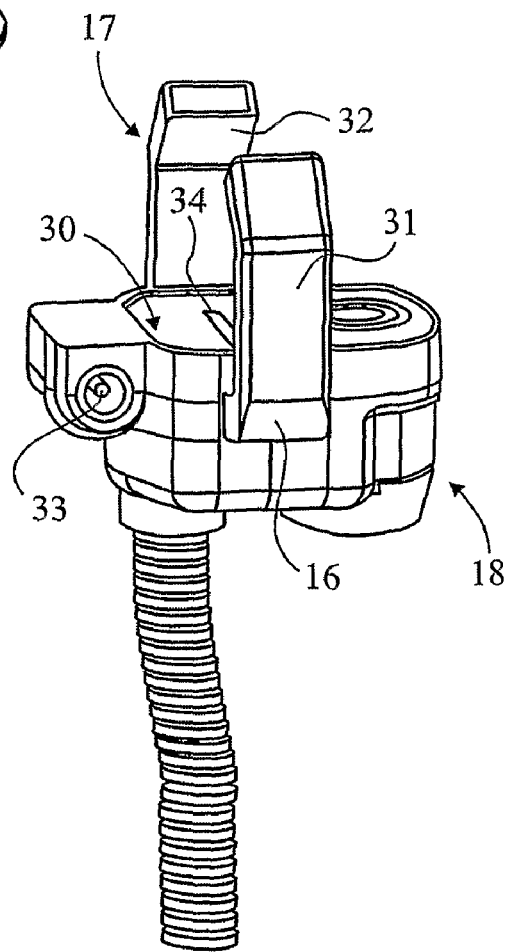
FIG. 3 illustrates a security clamp.

FIG. 3 illustrates a further view of the clamping device 18 without the mobile telephone being in place. As illustrated in FIG. 3 the housing 18 includes an upper support surface 30 against which the mobile telephone is urged by the clamping jaws. It is to be noted that each clamping jaw includes a substantially upright portion 31 together with an inwardly inclined tip portion 32. As such the opposed jaws operate to constrain the mobile telephone in two dimensions. Firstly, the jaws define a distance between them which may be set by a user, as will be described hereinafter, so as to clamp sides 13, 14 of the mobile telephone so as to prevent movement by a user in that dimension. In addition, the inwardly turned tips 32 of each jaw act on an upper portion of a side surface or on an upper surface 10 of the mobile telephone so as to urge the mobile telephone downwardly against the upper support surface 30 of the clamp housing.

FIG. 3 also helps illustrate the universal socket 33 housed in a side chamber of the clamp housing. It will be appreciated that a connector 19 specific to any single electrical device will be provided so that the electrical device may be clamped onto the support surface 30 of the clamp housing and then power supplied to that electrical device using a connector having a first plug to fit the universal socket 33 and a second plug at a remainder end of the connector 19 specific to the specific mobile telephone. The universal socket 33 is provided with power via the wire which extends along the security sheath 24 to a power source.

A longitudinal slot 34 is formed in the upper surface of the support surface 30. This slot is arranged to receive a mating locating bar secured to the mobile telephone.

Figure 4:
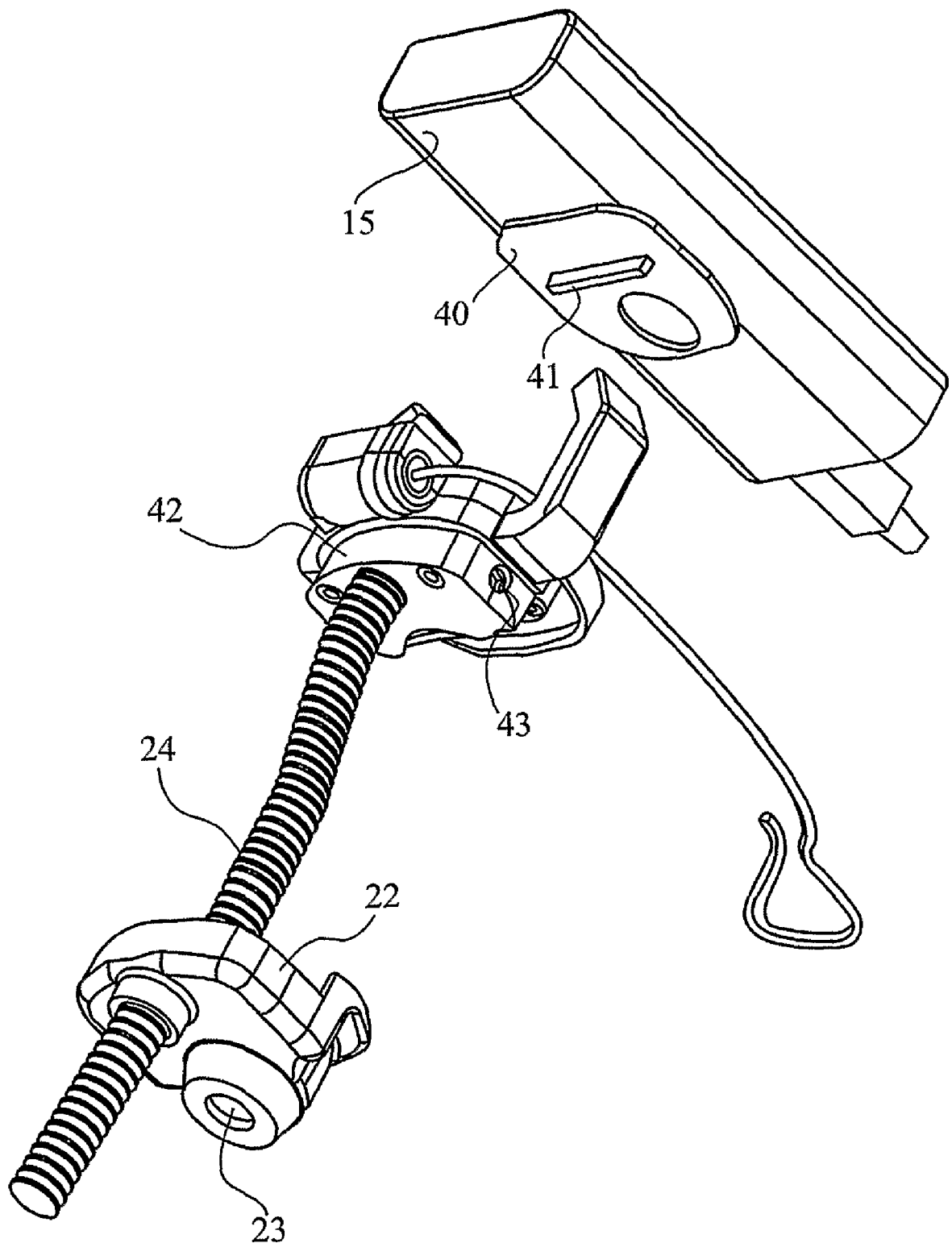
FIG. 4 illustrates a security clamp to which a mobile telephone is to be secured and having a back cover open.

FIG. 4 illustrates an exploded view of the clamp housing together with a view of the back side 15 of the mobile terminal to which a security plate 40 is secured by means of some sort of high friction element. Preferably the high friction element comprises a layer of adhesive so that the plate 40 is stuck to the back of the mobile telephone. It will be appreciated that embodiments of the present invention can utilise many different types of high friction element for example the plate may be stuck via suckers to the back of the mobile telephone or may simply include a sheet of high friction material between the plate itself and the back surface 15 of the mobile telephone. The effect of the plate and high friction element is that the plate is resistant to movement with respect to the back surface of the mobile telephone.

An elongate locating bar extends outwardly from the back plate. The bar 41 is designed so as to mate with the slot 34 formed in the support surface 30 of the clamp housing. It will be appreciated that any type of mating locating devices, such as pins and holes or triangular members with mating triangular holes, can be formed on the back plate and support surface. The purpose of the back plate 40 and locating bar 41 is that when the mobile telephone is duly located with the locating bar in the slot 34 and then is clamped by drawing the jaws 16, 17 of the clamp together, movement of the mobile telephone is substantially constrained, firstly from side to side motion by virtue of the jaws of the clamp but also from movement across the support surface by virtue of the interlocked male extending bar 41 and female slot 34. The tips of the jaws urge the mobile telephone against the support surface so that the locating bar and slot are kept together and thus prevent movement by an unauthorised user.

FIG. 4 also helps illustrate how the back cover 22 of the clamp housing may be removed via an unlocking process by placing a key in the keyhole 23 and turning. Removal of the cover housing will also remove the locking mechanism which extends through the back of the cover. Removal includes sliding the housing along the security sleeve 24. Removal of the cover reveals a back portion of a lower body portion 42 of the clamp housing 18. Notably removal of the tamperproof cover reveals access to a jaw setting aperture 43 by means of which an authorised user may set the distance between the lockable clamping jaws 16, 17. A user sets this distance by locating a further security key through the aperture 43 and turning. This draws the jaws together to clamp a device therebetween or opens the jaws apart to facilitate removal as will be described hereinafter in more detail.

Figure 5:
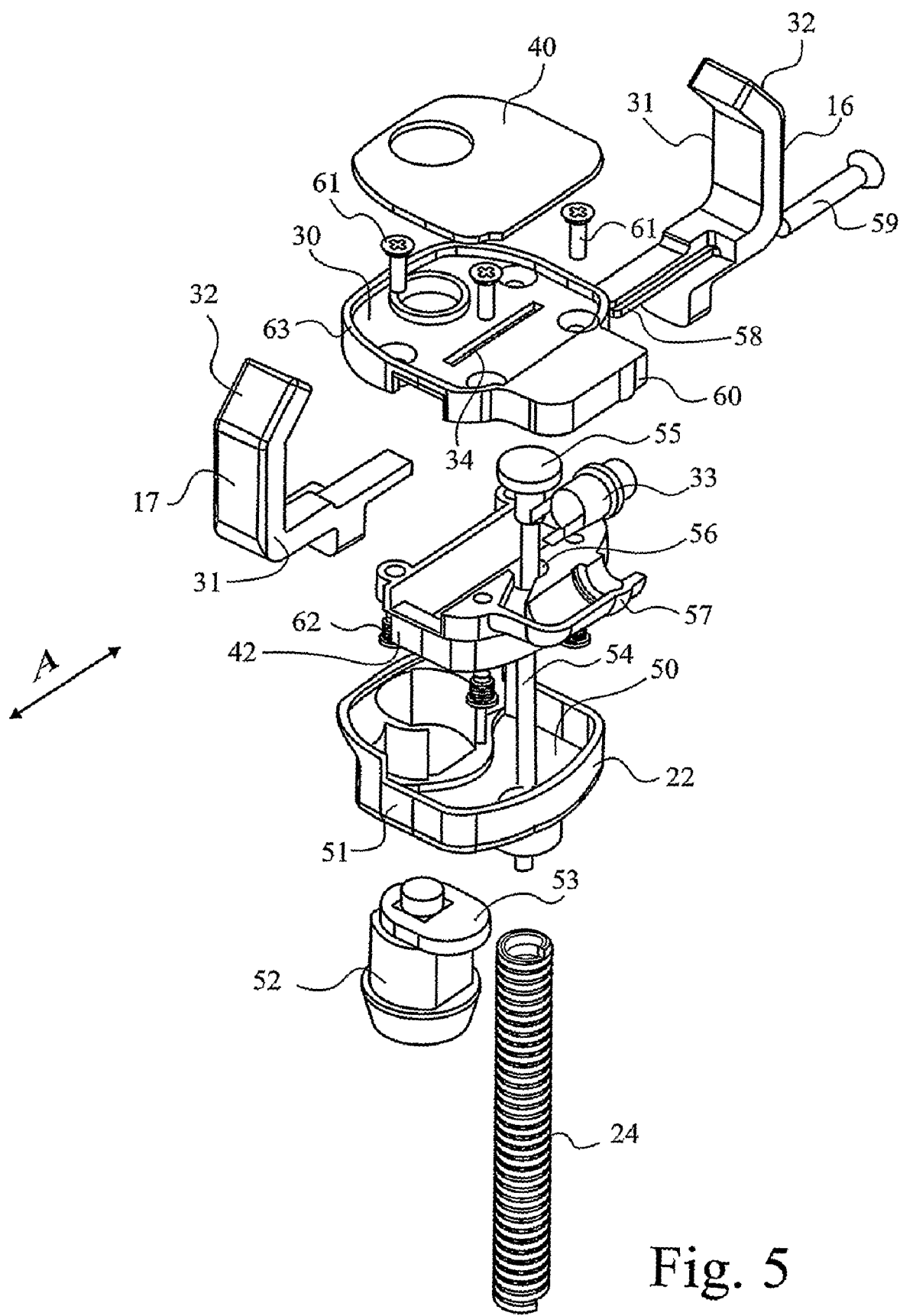
FIG. 5 illustrates an exploded view of a security clamp.

FIG. 5 illustrates an exploded view of parts of the clamping mechanism in more detail. The clamp housing 18 includes a back cover 22 which includes a base portion 50 and surrounding side wall 51. A hole 23 is formed in the back of the cover. A cam lock 52 includes a cam 53 which is turned when a user places a key through the keyhole 23 in the back cover and rotates the key. This facilitates removal of the back cover and locking mechanism so as to reveal access to the security keyhole 43.

A security tether 54 extends through the cover and out through an aperture in the cover guarded by security sleeving 24. The security tether 54 is formed from a material which is resistant to cutting or sawing and is secured at a first end (not shown) by an authorised user to a rigid fixing point. At a further end of the tether 54 is a termination cap 55 which has dimensions greater than a hole 56 through which the tether 54 passes in a lower body portion 42 of the clamp housing. This prevents removal of the device by simply pulling the mobile telephone and clamp housing away from the tether. The lower body portion 42 of the clamp housing also includes a side region 57 which forms part of a chamber in which a universal socket 33 is located. It will be understood that the universal socket 33 is connected by a suitable connector (such as a wire) which passes through the aperture 56 in the lower body portion of the clamp housing and downwardly through the back cover shielded by the security sleeving. This wire is not shown for the purposes of convenience to the reader. The jaw member 17 includes an upright region 31 together with an inwardly inclined tip 32. In addition, a lower elongate region provides a grooved surface. The jaw member 16 includes an upright region 31 and inwardly turned tip region 32 together with a toothed region 58. The tongue and grooved regions of the jaws mean that the jaws slide against each other in the direction illustrated by arrow A in FIG. 5 so that the distance between the jaws may be set by a user at a predetermined distance. Effectively the user will tighten a screw 59 by accessing the keyhole 43 with a suitable key. This will enable the user, by turning the screw 59, to open or close the opposed jaws to clamp or release a mobile telephone between the jaws and also, by virtue of the inwardly inclined tips 32, to urge the mobile telephone downwardly against the support surface 30 or away from it respectively. It will be understood that whilst embodiments of the present invention have been described with respect to two mutually locatable jaws, it would be sufficient for one jaw to be fixed in position with a second jaw able to move independently with respect to that fixed jaw. Likewise it is to be understood that only one of the jaws needs an inclined tip to urge the phone against the support surface.

It is also to be understood that resilient pads may be formed on an inside surface of the jaws (described in a further embodiment later). The resilient pads may be shaped to closely match a specific mobile telephone to be clamped in place and will prevent damage to the mobile telephone.

An upper body portion 60 of the clamp housing includes the upper support surface 30 and an upper portion f the chamber in which the universal socket 33 will sit. The upper body portion of the housing is secured to the lower body portion by virtue of securing screws 61 which mate with matching nuts 62. Alternative ways of securing the parts of the housing together can of course be used in accordance with embodiments of the present invention. The plate which is typically adhered to the mobile telephone is illustrated in FIG. 5. An upper surface of the plate 40 is illustrated in FIG. 5. A reverse side will include the locating bar which will mate with the elongate slot 34 provided in the upper body portion of the housing as described earlier.

A side wall 63 of the upper body portion of the clamping mechanism extends upwardly around the periphery of the support surface 30. This side wall is configured to match substantially with the security plate 40 so that when the security plate 40 is secured to a mobile telephone and then the mobile telephone and plate urged against the support surface 30, the side wall 63 will bear against edge regions of the security plate 40 as well as the locating bar mating with the locating slit. This helps to prevent movement of the mobile telephone with respect to the clamp housing.

Figures 6, 7:
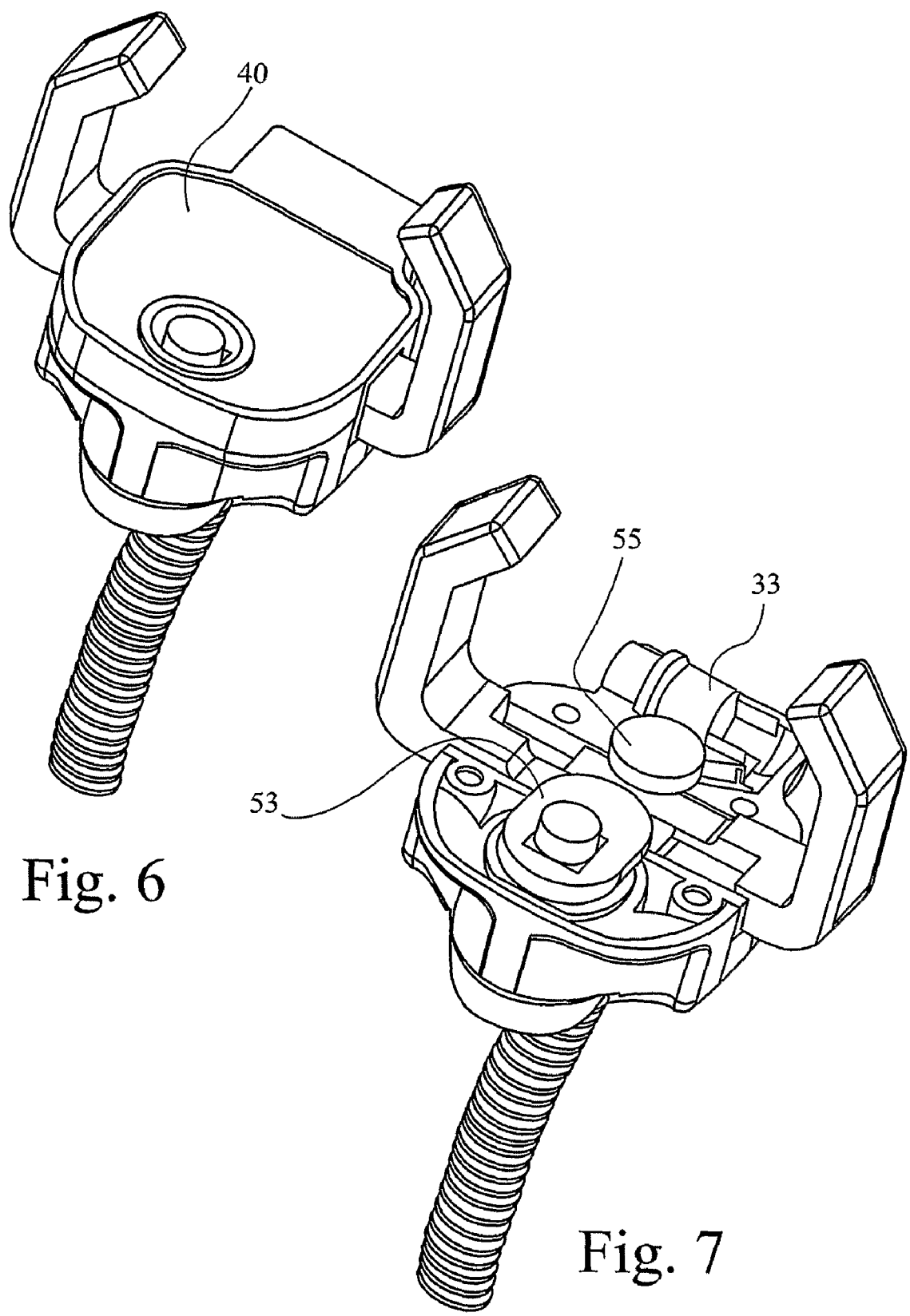
FIG. 6 illustrates another view of a security clamp support surface with security plate.
FIG. 7 illustrates an open security clamp having an upper part of a housing removed.

FIG. 6 illustrates a further view of the upper support surface 30 of the clamp housing. FIG. 6 illustrates the clamp housing with the security plate 40 located on the support surface 30 of the clamp housing. As such it will be appreciated that the mobile telephone would normally be adhered to the surface of the back plate 40 shown in FIG. 6. The back plate 40 has a hole matching a hole defined by an upwardly extending circular side wall in the support surface and a portion of the lock 52 extends all the way through to be revealed as shown in FIG. 6. This provides a very compact clamp housing. It will be appreciated that in embodiments of the present invention the clamp housing may be generally larger in which case the hole through the back plate and upper body portion of the housing would not prove necessary.

FIG. 7 illustrates a cut away view of an upper surface of the lower body portion 42 of the clamp housing. The universal socket 33 rests on a lower portion of a cavity defined by the lower body portion of the clamp housing. The two opposing jaw members are also illustrated slotted together so as to smoothly glide with respect to each other so as to open or close the jaws. It is to be noted that it is preferable that the jaw members are made of a rigid material such as metal or hard plastic so as to prevent the jaw members being snapped off by an unauthorised user intent on stealing the mobile telephone. In view of this material the termination cap 55 is located so that at least a portion of the cap extends over a surface region of one or more of the jaws. This further helps prevent an unauthorised user pulling the mobile telephone and clamping mechanism away from the security tether as the portion of the termination cap will bear against a surface of the jaws and will thus be prevented from being pulled away from the tether. In a similar manner the cam 53 of the locking mechanism 52 also has a region which in a locking position extends over a portion of at least one of the jaw members. When a user introduces a key into keyhole 23 and turns the key, the cam will move in a rotating fashion away from engagement with a locking surface and surface contact with the jaws so that the cover of the housing can be removed.

FIG. 8 illustrates a further clamping mechanism in accordance with a second embodiment of the present invention. The FIG. 8 clamping mechanism is particularly suitable for securing a "clam-shell" type mobile telephone at a desired location. The mobile telephone 10 includes a user interface including a screen 11 and keys 12. These are provided on a front side of the mobile telephone as well as a side region so as to be viewed and used by a user. A user can select functions provided by the electrical device by pressing one or more of the keys 12. The mobile telephone has a first and second side 13, 14 and back side 15. An ear piece section of the phone rotates about hinge 80 when the phone is flipped open.

The mobile telephone 10 is clamped by virtue of two jaws 16, 17 which help secure the mobile telephone to a housing 18 of the security clamp. A connector 81 including a wire 82, has at a first end a plug 83 selected to fit a desired mobile telephone. At a remaining end of the wire (not shown in FIG. 8) the wire is plugged into a power socket. This is similar to how mobile telephones are normally recharged.

FIG. 9 illustrates a front view of the electrical device when clamped between the jaws 16, 17 of the clamp. A tether 54 extends from the back of the housing and may be secured to a fixed location. Unlike with the first embodiment, the tether 54 and wire of the connector 19 are not protected by a security sheath and are independently directed so that the wire goes to a power source and the tether to a fixed point. It will be understood that in accordance with embodiments of the present invention a security sleeve could be provided so as to protect at least the tether 54 and possibly the wire of the connector.

FIG. 10 illustrates the jaws and housing portions of the clamp 10 in more detail. Each of the jaws 16, 17 is provided with a respective resilient pad 100 which is fixed to a respective jaw by a securing mechanism 101 such as a pin which mates with a corresponding hole in a respective jaw to stop the pad sliding out or being dislodged. Each resilient pad conforms with an inner surface of the jaw whilst having an inwardly facing surface which is configured to match closely with a portion of a specific mobile telephone which is to be secured by the mounting clamp. FIG. 10 illustrates the clamping mechanism with a back plate 40 resting on the support surface 30. It will be understood that this back plate would normally be adhered or stuck via some high friction element to a mobile telephone so as to prevent sliding motion of the mobile telephone with respect to the support surface.

In a side 102 of a body part of the clamping mechanism an access point, which is provided to allow a user to access a security keyhole to set a distance between the jaw, is covered by a cap 103. When the cap 103 is removed (as hereinbelow described) a user can access a security keyhole and either open or close the opposed jaws. By opening the jaws a mobile phone is released and can be removed by a user. By tightening a security screw the opposed jaws can be drawn together which clamps sideways movement of the mobile phone as well as urging the mobile phone downwardly into contact with the support surface 30.

Figure 11:
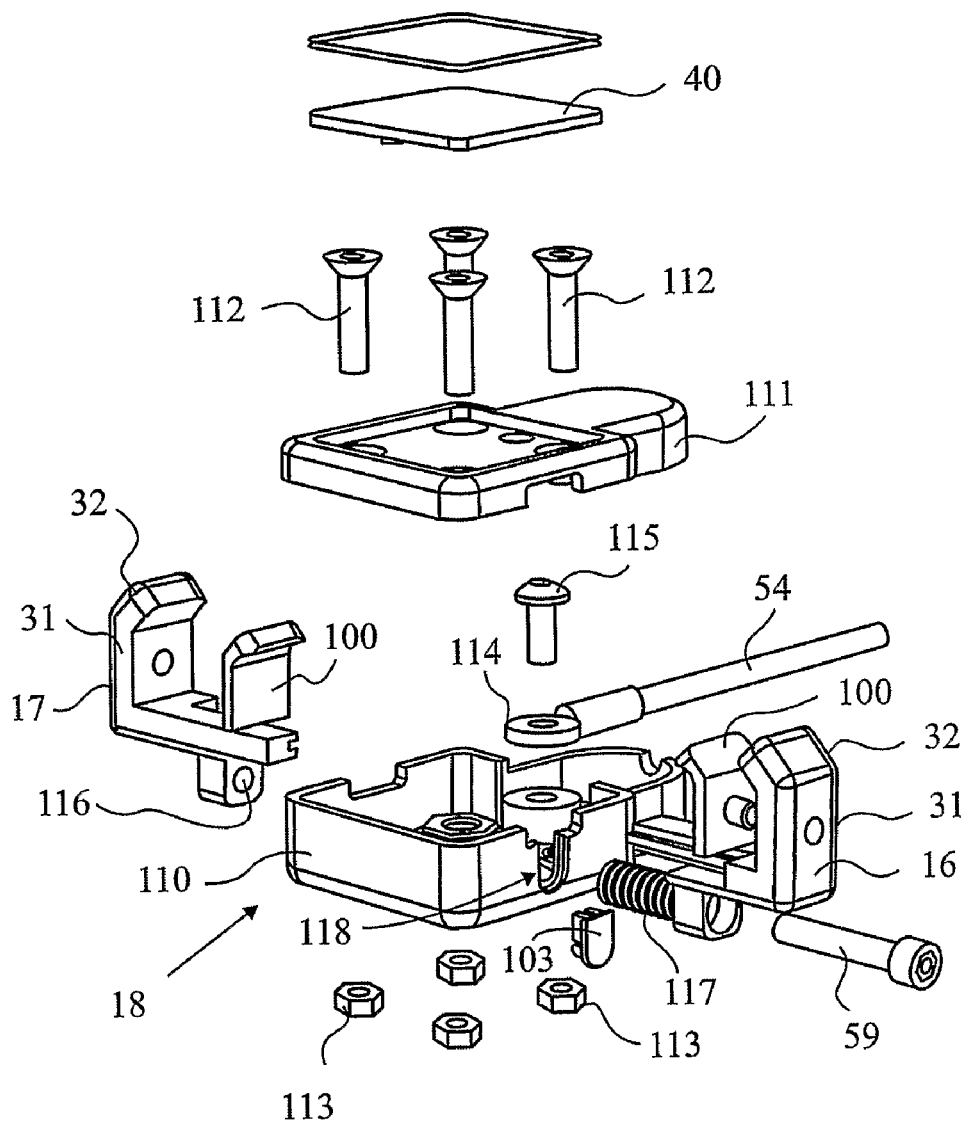
FIG. 11 illustrates an exploded view of a security clamp.
Figure 11:
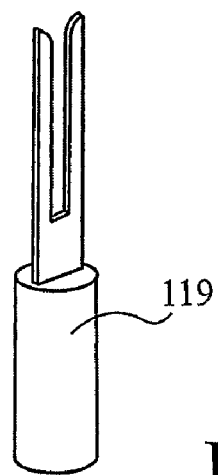

FIG. 11 illustrates an exploded view of the securing apparatus according to the second embodiment of the present invention. The housing 18 includes a lower body portion 110 and an upper body portion 111. The two portions of the housing are secured together by securing screws 112 which are secured into respective securing nuts 113. It will be appreciated that any other type of securing mechanism could be utilised in accordance with an embodiment of the present invention.

The tether 54 is terminated with a termination ring 114 which is secured to a portion of the lower body 110 of the housing via a securing screw 115. This effectively tethers the housing 18 to a fixed point to which a remainder end of the tether 54 is secured.

Each jaw member 16, 17 includes an upright section 31 and inwardly inclined tip 32. In addition, an elongate bottom portion of each jaw is provided, one of which is tongued and one grooved. When mounted in the housing the jaws can thus slide with respect to each other so as to set a distance between opposing faces of resilient pads 100 mounted to each jaw. The distance between the jaws is set by rotating a security screw 59 which bites into a matching threaded region 116 in one of the jaws 17. A spring 117 is provided so as to resiliently bias the jaws apart. Thus a user wishing to clamp a mobile telephone or other such electrical device in the jaws must urge the two jaws together by turning the screw 59 which draws the jaws together. It will be appreciated that the resilient biasing spring is not needed but is a preferable feature.

Figure 12A:
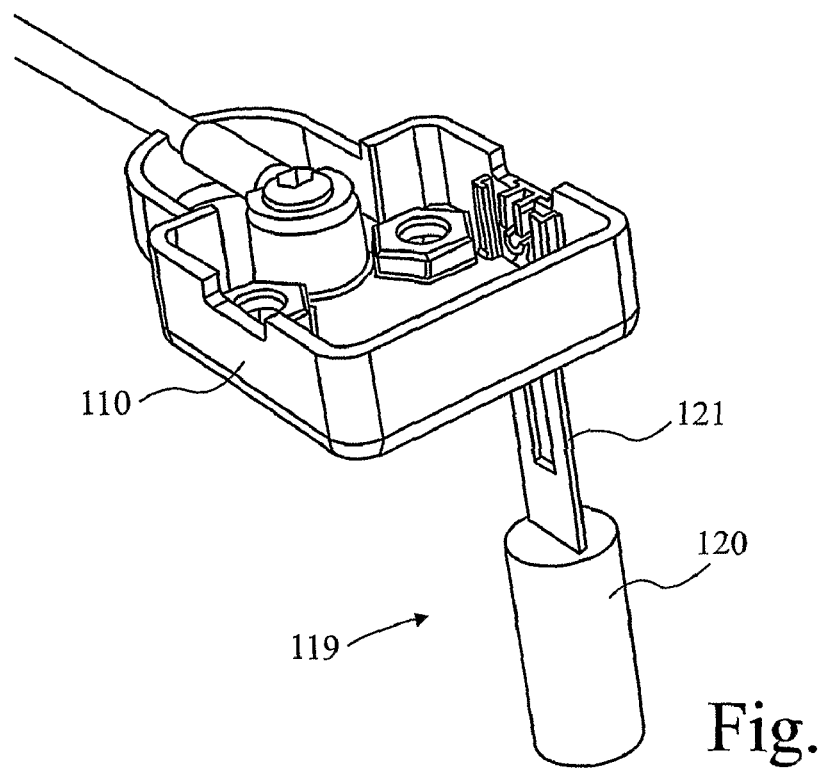
FIGS. 12A and 12B illustrate removal of a cap from a security clamp.
Figure 12B:
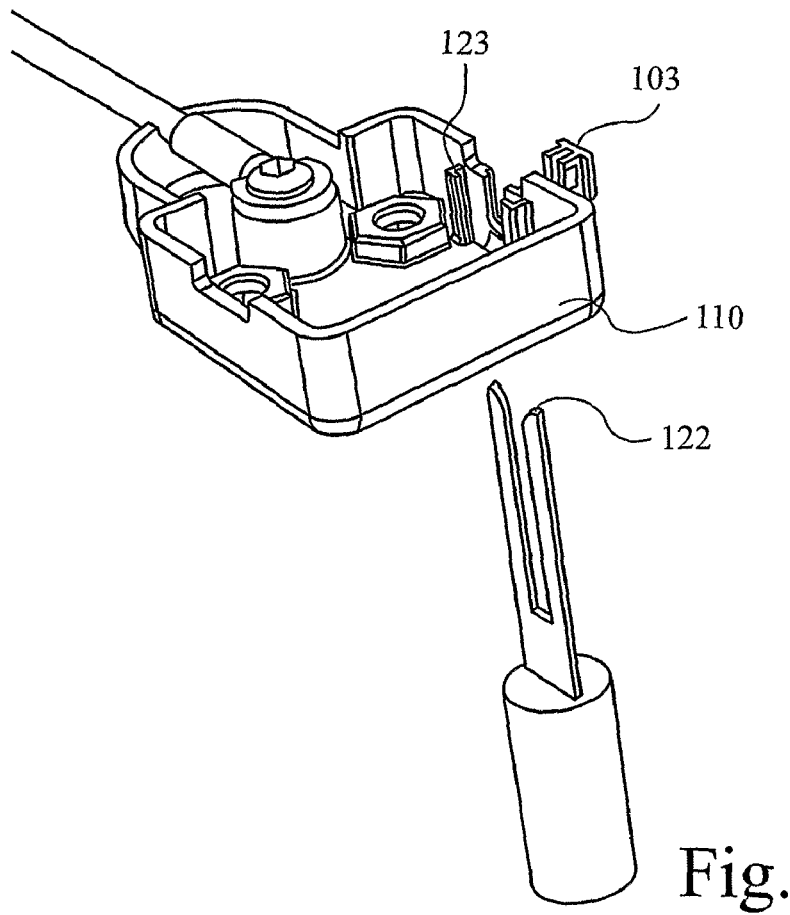

A security cap 103 closes a keyhole orifice 118 in the lower portion 110 of the housing. When the cap is in place the orifice is closed which prevents access by unauthorised users to a screw head of the screw 59 which is located during normal use in the housing. A tool 119 is introduced through slits in the housing so as to deflect securing ears of the cap 103 from a locked position. This facilitates removal of the cap by an authorised user. This is illustrated more clearly in FIGS. 12A and 12B. The tool 119 includes a handle portion 120 and two rigid elongate ears 121. The ears can be slid through respective slots formed in the lower body portion 110 of the housing and have an inclined end region 122 which slides within guide rails 123 so as to urge a locking ear away from a locking surface of the cap 103. The cap 103 can thus be clipped into place by a user without the tool 119 or removed in a sideways movement by an authorised user having access to the tool 119. Removal of the cap 103 provides access to the security screw 59 which then allows the authorised user to set a distance between the jaws so as to release a mobile telephone or clamp the mobile telephone to the housing.

Figure 13:
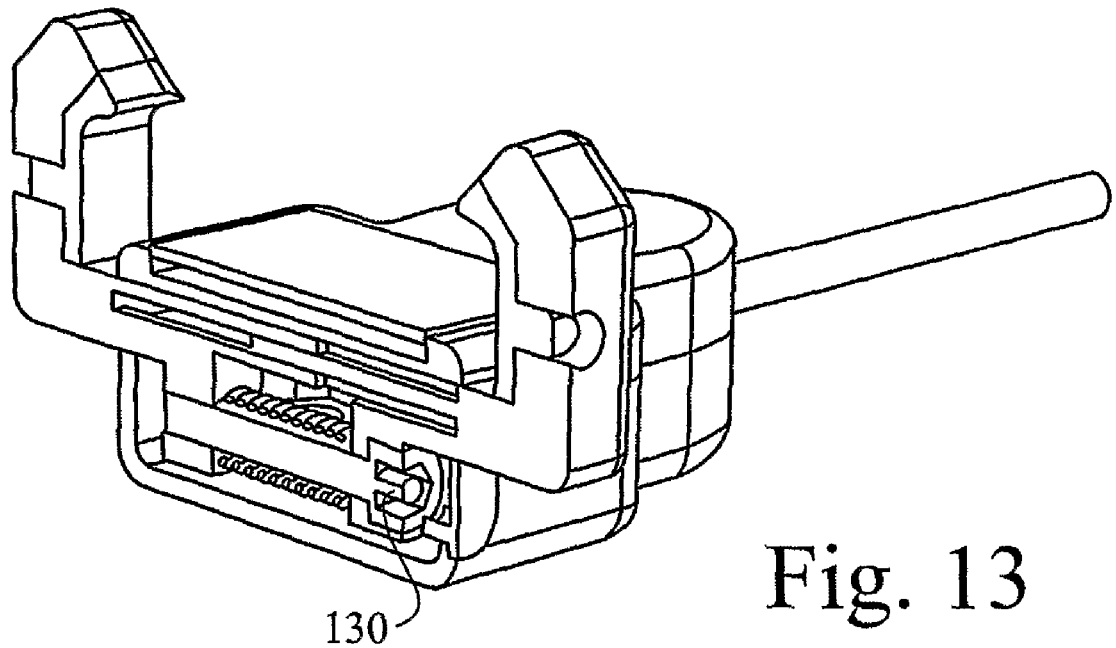
FIG. 13 illustrates a cut through section of a security clamp and jaws.

FIG. 13 illustrates a section through the housing and jaws in more detail.

Figure 14:
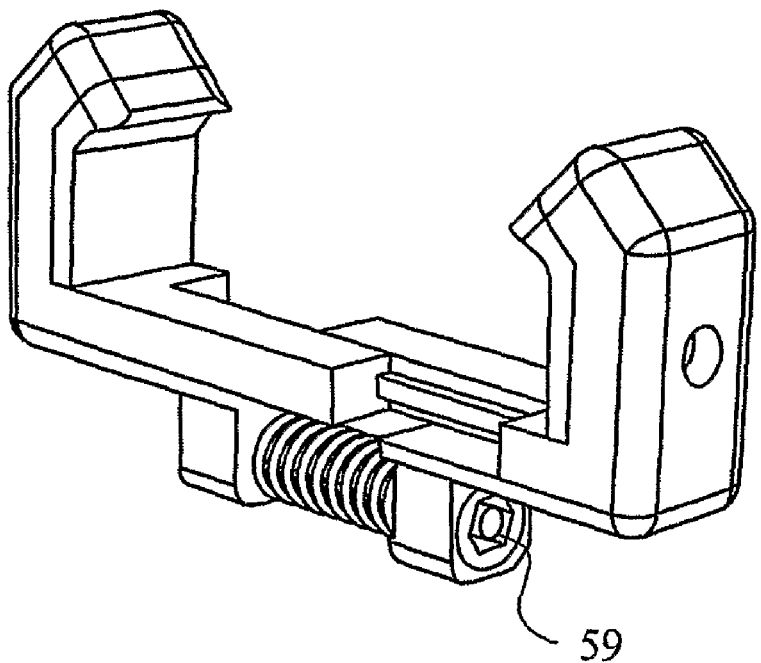
FIG. 14 illustrates jaws of a security clamp sliding apart.

FIG. 14 illustrates how the tongue and grooved portions of the jaws will slide together so that the distance between the jaws can be set by turning the security screw 59. The security screw 59 can be provided with a security head 130 so that an authorised user requires a special security key to set the distance between the jaws.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. Apparatus for securing an electrical device at a desired location, comprising:
   a housing comprising a support surface on which an electrical device can be supported;
   a pair of lockable, opposed jaw members mounted with said housing, locatable with respect to each other, and arranged to be urged against respective sides of said electrical device to thereby clamp said electrical device at a desired location; and
   a locking device that sets the distance between the jaw members when clamped against the electrical device so as to prevent an unauthorized user from opening the jaw members and removing the electrical device from the desired location between the jaw members;
   wherein at least one of said jaw members includes a region arranged to urge said electrical device against said support surface when said electrical device is clamped at said desired location.

2. The apparatus as claimed in claim 1, further comprising:
   a high friction element provided between said support surface and a back side of said electrical device.

3. The apparatus as claimed in claim 2, further comprising:
said high friction element comprises a layer of high friction material or one or more sucker members.

4. The apparatus as claimed in claim 2, further comprising:
said high friction element comprises an adhesive layer provided between said support surface and a back side of said electrical device.

5. The apparatus as claimed in claim 1, further comprising:
a rigid plate member securable to a back side of said electrical device via an adhesive layer.

6. The apparatus as claimed in claim 5, further comprising:
said plate member comprises a locating member arranged to mate with a corresponding locating member on said support surface of the housing.

7. The apparatus as claimed in claim 6, further comprising:
said plate member locating member comprises an elongate wall member extending outwardly from a surface of the plate member and said corresponding locating member comprises a slit formed in the support surface of the housings.

8. The apparatus as claimed in claim 1, further comprising:
each jaw member is arranged to be locatable responsive to turning of a security screw in said housing by a user.

9. The apparatus as claimed in claim 1, further comprising:
each jaw member comprises an inwardly facing end region extending from an upwardly extending arm region, each end region being arranged to urge a surface of an electronic device clamped to the housing by the jaw members against the support surface.

10. The apparatus as claimed in claim 1, further comprising:
for each jaw member a respective resilient pad secured to the jaw member.

11. The apparatus as claimed in claim 10 wherein each said pad has a configuration determined to match in shape with a selected electrical device.

12. The apparatus as claimed in claim 1, further comprising:
each jaw member comprises an elongate arm, an elongate arm of a first jaw member including a tongue region and an elongate arm of a remainder jaw member including a grooved region, the tongue and grooved regions being slidable with respect to each other when a distance between the jaw members is set.

13. The apparatus as claimed in claim 12, further comprising:
at least one of the jaw members includes a threaded region wherein a user wishing to set a distance between the jaws can turn a screw having a male threaded portion arranged to mate with the jaw member threaded regions.

14. The apparatus as claimed in claim 1, further comprising:
a security cable having an end terminated with a termination cap or ring housed in said housing, an access point in said housing through which the cable passes being smaller than a corresponding dimension of said termination cap.

15. The apparatus as claimed in claim 14, further comprising:
said cap is located in the housing such that a pulling force exerted on the security cable will urge a portion of the cap against a portion of at least one of said jaw members.

16. The apparatus as claimed in claim 1, further comprising:
said housing comprises a common socket arranged to receive a common plug, said housing providing an access point for at least one wire connected to said socket to exit the housing.

17. The apparatus as claimed in claim 1, further comprising:
a cover for covering an access point in said housing providing access to a security screw.

18. The apparatus as claimed in claim 17, further comprising:
said cover comprises a cap arranged to cover an inlet in a lower portion of said housing.

19. The apparatus as claimed in claim 17, further comprising:
said cover comprises a back cover housing supporting a cam member and including a wall portion arranged to cover an access point to said security screw, said access point being located in a region of a lower portion of said housing.

20. The apparatus as claimed in claim 1 wherein said electrical device comprises a mobile terminal.

21. The apparatus as claimed in claim 20 wherein said mobile terminal comprises a mobile phone.

22. A connector comprising a wire and at a first end thereof, a common plug and at a remainder end thereof a power connector for a respective electrical device for use with an apparatus as claimed in claim 1.

23. A method for securing an electrical device at a desired location, comprising the steps of:
securing a housing comprising a support surface and a pair of lockable, opposed jaw members at a predetermined location;
locating an electrical device on said support surface between said jaw members;
clamping sides of said electronic device between said jaw members;
simultaneously urging a back surface of the electrical device towards the support surface; and
locking the jaw members in place against the electrical device so as to prevent an unauthorized user from opening the jaw members and removing the electrical device from its location between the jaw members.

24. The method as claimed in claim 23, further comprising:
providing a high friction element between a back side of said electrical device and said support surface.

25. The method as claimed in claim 24, further comprising:
said step of providing a high friction element comprises providing a layer of high friction material or one or more sucker members.

26. The method as claimed in claim 24, further comprising the steps of:
said step of providing a high friction element comprises providing a layer of adhesive between a back side of said electrical device and said support surface prior to clamping said electrical device between said jaw members.

27. The method as claimed in claim 23, further comprising the steps of:
prior to clamping said electrical device between said jaw members, securing a locating plate comprising a locating member to a back side of said electrical device; and
via said locating member and a mating locating member disposed at said support surface, locating the electrical device at a desired location on said support surface.

28. The method as claimed in claim 23, further comprising the steps of:
  providing power to said electronic device when said electronic device is clamped to said housing.

29. The method as claimed in claim 23, further comprising the steps of:
  selecting a pair of opposed jaws from a plurality of pairs of opposed jaws, responsive to a type of electronic device to be secured at a desired location being selected.

30. The method as claimed in claim 23, further comprising the steps of:
  covering an access hole in said housing subsequent to a clamping operation to thereby prevent unauthorised removal of the electronic device.

31. The method as claimed in claim 23 wherein said electronic device comprises a mobile phone.

32. Apparatus for securing an electrical device at a desired location, comprising:
  a housing comprising a support surface on which an electrical device can be supported;
  a pair of lockable, opposed jaw members mounted with said housing, locatable with respect to each other, and arranged to be urged against respective sides of said electrical device to thereby clamp said electrical device at a desired location; and
  locking means for setting the distance between the jaw members when clamped against the electrical device and preventing an unauthorized user from opening the jaw members and removing the electrical device from the desired location between the jaw members;
  wherein at least one of said jaw members includes a region arranged to urge said electrical device against said support surface when said electrical device is clamped at said desired location.

* * * * *